(12) United States Patent
Mori

(10) Patent No.: US 10,392,993 B1
(45) Date of Patent: Aug. 27, 2019

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Kohei Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/291,219

(22) Filed: Mar. 4, 2019

(30) Foreign Application Priority Data

Apr. 24, 2018 (JP) .................................. 2018-083345

(51) Int. Cl.
   *F01N 3/20* (2006.01)
   *B01D 53/94* (2006.01)
   *F01N 3/10* (2006.01)

(52) U.S. Cl.
   CPC ......... *F01N 3/208* (2013.01); *B01D 53/9418* (2013.01); *F01N 3/105* (2013.01); *F01N 2560/026* (2013.01); *F01N 2610/02* (2013.01)

(58) Field of Classification Search
   CPC ...... F01N 3/208; F01N 2610/02; F01N 3/105; F10N 2560/026; B01D 53/9431; B01D 53/9418
   USPC .................................... 422/168; 60/286, 287
   See application file for complete search history.

(56) References Cited

U.S. PATENT DOCUMENTS

| 2007/0175208 | A1* | 8/2007 | Bandl-Konrad ... B01D 53/9431 60/286 |
| 2011/0000290 | A1* | 1/2011 | Sawada ............... F02D 41/1461 73/114.75 |
| 2011/0265461 | A1* | 11/2011 | Shibata ................... F01N 3/208 60/287 |
| 2013/0064716 | A1* | 3/2013 | Fukuoka ................. F01N 3/208 422/106 |
| 2013/0104638 | A1* | 5/2013 | Takahashi ............... F01N 3/208 73/114.71 |
| 2016/0109420 | A1* | 4/2016 | Furui ................. G01N 33/0037 422/83 |
| 2016/0215669 | A1* | 7/2016 | Matsumoto ........... F01N 3/2066 |

FOREIGN PATENT DOCUMENTS

| EP | 1426575 A1 | 6/2004 |
| JP | 2004-176719 A | 6/2004 |

* cited by examiner

*Primary Examiner* — Tom P Duong
(74) *Attorney, Agent, or Firm* — Oliff PLC

(57) ABSTRACT

An exhaust gas control apparatus for an internal combustion engine includes a selective reduction catalyst (SCR), a urea solution supply device and a control device. The control device diagnoses abnormality of the SCR in accordance with an amount of ammonia that is discharged to a downstream side of the SCR when supplying a urea solution in a supply amount at an abnormality diagnosis time that is a supply amount larger than a target supply amount to the SCR. Further, the control device performs control of decreasing a supply amount of the urea solution when predetermined conditions are satisfied after abnormality diagnosis of the SCR. Here, the predetermined conditions are that an estimated amount of ammonia adsorbed by the SCR is larger than the reference adsorption amount, and an amount of the urea solution required in removal of nitrogen oxide per unit is smaller than a reference urea solution amount.

1 Claim, 5 Drawing Sheets

EXHAUST GAS CONTROL APPARATUS FOR INTERNAL COMBUSTION ENGINE

CROSS-REFERENCE TO RELATED APPLICATION

The present application claims priority under 35 U.S.C. § 119 to Japanese Patent Application No. 2018-083345, filed Apr. 24, 2018. The contents of this application are incorporated herein by reference in their entirety.

BACKGROUND

Field

The present disclosure relates to an exhaust gas control apparatus for an internal combustion engine including a selective reduction catalyst that reduces nitrogen oxides in exhaust gas, with ammonia as a reducing agent.

Background

There is known an exhaust gas control apparatus for an internal combustion engine including a selective reduction catalyst disposed in an exhaust passage to remove nitrogen oxides (hereinafter, also described as "NOx") in exhaust gas. The exhaust gas control apparatus includes, for example, an addition device that adds a reducing agent such as a urea solution to the exhaust passage, and performs reducing treatment of NOx with use of ammonia (hereinafter, also described as "$NH_3$") derived from the added reducing agent as a reducing agent.

Further, some of exhaust control apparatuses have functions of performing abnormality diagnosis of selective reduction catalysts.

For example, JP 2004-176719 describes control of diagnosing presence or absence of a defect of a system in an exhaust gas post-treatment system having a selective reduction catalyst that removes NOx in exhaust gas by a reducing agent. Specifically, in the control of defect diagnosis, an amount of the reducing agent to be supplied is changed, and it is inspected whether a signal of a sensor disposed in an exhaust system indicates a change corresponding to the change of the supply amount of the reducing agent. When the signal of the sensor does not indicate a predetermined change as a result, the exhaust gas post-treatment system is diagnosed as having a defect.

SUMMARY

There is known a method of diagnosing abnormality of a catalyst when a larger amount of $NH_3$ than a predetermined amount flows out downstream of the catalyst by increasing the amount of a reducing agent that is supplied to the catalyst, in order to diagnose abnormality of the selective reduction catalyst. When the amount of the reducing agent to be supplied is increased to diagnose abnormality of the catalyst in this way, the amount of $NH_3$ that is adsorbed by the catalyst temporarily increases after control of abnormality diagnosis. When supply of a large amount of reducing agent is executed for the abnormality diagnosis of the next time, in a state in which the $NH_3$ adsorption amount of the catalyst exceeds a threshold value, adsorption of $NH_3$ in the catalyst is saturated. As a result, $NH_3$ flows out downstream of the catalyst regardless of whether the catalyst is normal or abnormal.

Accordingly, in order to detect abnormality of the catalyst correctly by control of diagnosing abnormality of the catalyst based on an outflow amount of $NH_3$ downstream of the catalyst, it is necessary to wait until the $NH_3$ adsorption amount becomes less than the threshold value.

However, when an operation condition in which the NOx exhaust amount is low continues, for example, consumption of $NH_3$ that adsorbs to the catalyst is slow, and a considerable time period is required until the $NH_3$ adsorption amount of the catalyst is reduced to less than the threshold value. Consequently, an opportunity to diagnose abnormality of the catalyst cannot be sufficiently ensured.

The present disclosure has been devised in a view of the above problem, and an object of an example in the present disclosure is to provide an exhaust gas control apparatus for an internal combustion engine that is improved to be able to ensure an opportunity to diagnose abnormality early at a next time by reducing an $NH_3$ adsorption amount of a selective reduction catalyst early after abnormality diagnosis of the selective reduction catalyst.

An exhaust gas control apparatus for an internal combustion engine according to an example of the present disclosure includes a selective reduction catalyst, a urea solution supply device and a control device. The selective reduction catalyst is disposed in an exhaust passage of an internal combustion engine, and reduces a nitrogen oxide in exhaust gas with ammonia as a reducing agent. The urea solution supply device is installed at an upstream side of the selective reduction catalyst, and supplies a urea solution to the exhaust passage A control device is configured to control the urea solution supply device so that a urea solution in a target supply amount is supplied to the selective reduction catalyst. The urea solution in a target supply is corresponding to a concentration of a nitrogen oxide flowing into the selective reduction catalyst.

The control device is further configured to perform a control to diagnose presence or absence of abnormality of the selective reduction catalyst. As for this control, the control device controls the urea solution supply device so that a urea solution in a supply amount at an abnormality diagnosis time that is a larger supply amount than the target supply amount is supplied to the selective reduction catalyst, The control device is configured to diagnose presence or absence of abnormality of the selective reduction catalyst in accordance with an amount of ammonia that is discharged to a downstream side of the selective reduction catalyst, while the urea solution in the supply amount at the abnormality diagnosis time is supplied.

The control device is configured to perform a control to reduce the supply amount of the urea solution after diagnosis of presence or absence of abnormality of the selective reduction catalyst. As for this control, the control device is configured to control the urea solution supply device so that a supply amount of the urea solution becomes smaller than the target supply amount when an estimated amount of ammonia adsorbed by the selective reduction catalyst is larger than a reference adsorption amount, and when an amount of a urea solution that is required in removal of nitrogen oxide per unit is smaller than a reference urea solution amount.

The supply amount of the urea solution is increased at the time of diagnosis of presence or absence of abnormality of the selective reduction catalyst, so that the ammonia adsorption amount of the selective reduction catalyst increases temporarily. Presence or absence of abnormality of the selective reduction catalyst is diagnosed in accordance with the amount of ammonia which flows out downstream of the catalyst, so that in order to perform the abnormality diagnosis correctly, it is necessary to reduce the ammonia adsorption amount of the selective reduction catalyst to some degree. In the example in the present disclosure, the supply amount of the urea solution is configured to be decreased after abnormality diagnosis of the selective reduction catalyst. Accordingly, the ammonia adsorption amount of the selective reduction catalyst is reduced to the adsorption amount at the normal time early, and a state in which abnormality diagnosis of the next time is executable is brought about in an earlier stage. Accordingly, it is possible to secure more opportunities to execute abnormality diagnosis of the selective reduction catalyst.

DESCRIPTION OF EMBODIMENTS

Hereinafter, an embodiment of the present disclosure will be described with reference to the drawings. Note that in respective drawings, same or corresponding parts will be assigned with identical reference signs, and explanation of the same or corresponding parts will be simplified or omitted.

1. Entire System Configuration

Figure 1:
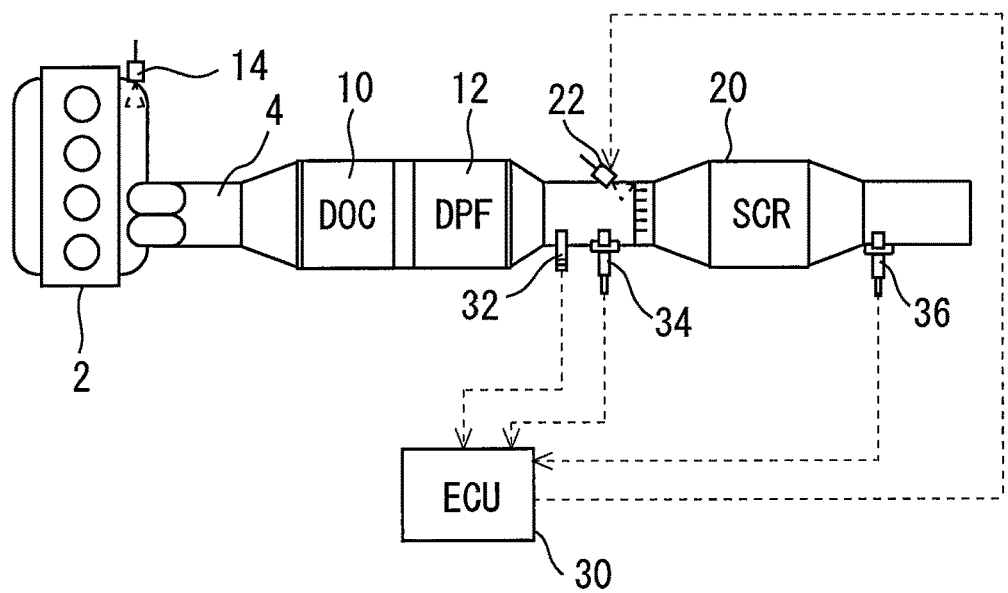
FIG. 1 is a diagram schematically illustrating a configuration of an entire system including an exhaust gas control apparatus and peripheral devices of the exhaust gas control apparatus of an embodiment of the present disclosure.

FIG. 1 is a diagram schematically illustrating a configuration of an entire system including an exhaust gas control apparatus and peripheral devices of the exhaust gas control apparatus of an embodiment of the present disclosure. The system in FIG. 1 has a compression self-ignition type internal combustion engine (hereinafter, referred to as an "engine") 2. Though FIG. 1 illustrates four cylinders, the number of cylinders and arrangement of the cylinders are not limited. Downstream of a turbocharger in an exhaust passage 4 of the engine 2, a DOC (Diesel Oxidation Catalyst) 10 and a DPF (Diesel Particulate Filter) 12 are disposed.

In the DOC 10, a catalyst that performs oxidation treatment of HC or the like that is unburned gas in exhaust gas is supported. The DPF 12 is a member that collects PM (particulate component) in exhaust gas, and is configured by porous ceramics, for example. In the DPF 12, a catalyst for promoting oxidation of PM is supported. Upstream of the DOC 10 in the exhaust passage 4, a fuel addition valve 14 for supplying fuel to the DOC 10 and the DPF 12 is installed.

Downstream of the DPF 12 in the exhaust passage 4, an SCR (Selective Catalytic Reduction) catalyst 20 that is a selective reduction catalyst is installed. A urea addition valve 22 that is a urea solution supply device is installed in the exhaust passage 4 at a downstream side of the DPF 12 and at an upstream side of the SCR catalyst 20. The urea addition valve 22 is connected to a urea solution tank not illustrated. Urea solution that is injected to the exhaust passage 4 from the urea addition valve 22 is hydrolyzed to be ammonia (hereinafter, referred to as "$NH_3$"), and is supplied to the SCR catalyst 20. The SCR catalyst 20 reduces nitrogen oxides (hereinafter, referred to as "NOx") in the exhaust gas with $NH_3$ derived from the supplied urea solution as a reducing agent.

The exhaust control apparatus further has a control device 30. To the control device 30, various sensors of the engine 2 in addition to an exhaust temperature sensor 32, a NOx sensor 34 and an $NH_3$ sensor 36 are electrically connected. To the control device 30, a plurality of actuators the operations of which the control device 30 controls are connected.

The actuators include at least the urea addition valve 22. The control device 30 calculates an operation amount of the urea addition valve 22 in response to a supply amount of the urea solution which is set, outputs a control signal to the urea addition valve 22, and thereby operates the urea addition valve 22 to control the supply amount of the urea solution.

The control device 30 is an ECU (Electronic Control Unit) having at least one processor and at least one memory. In the control device 30, various functions relating to control are realized by a program stored in the memory being loaded, and executed by a processor. Various kinds of information are inputted to the control device 30 from the various sensors. The control device 30 determines operation amounts of the respective actuators based on these kinds of information. Note that the control device 30 may be configured by a plurality of ECUs.

Figure 2:
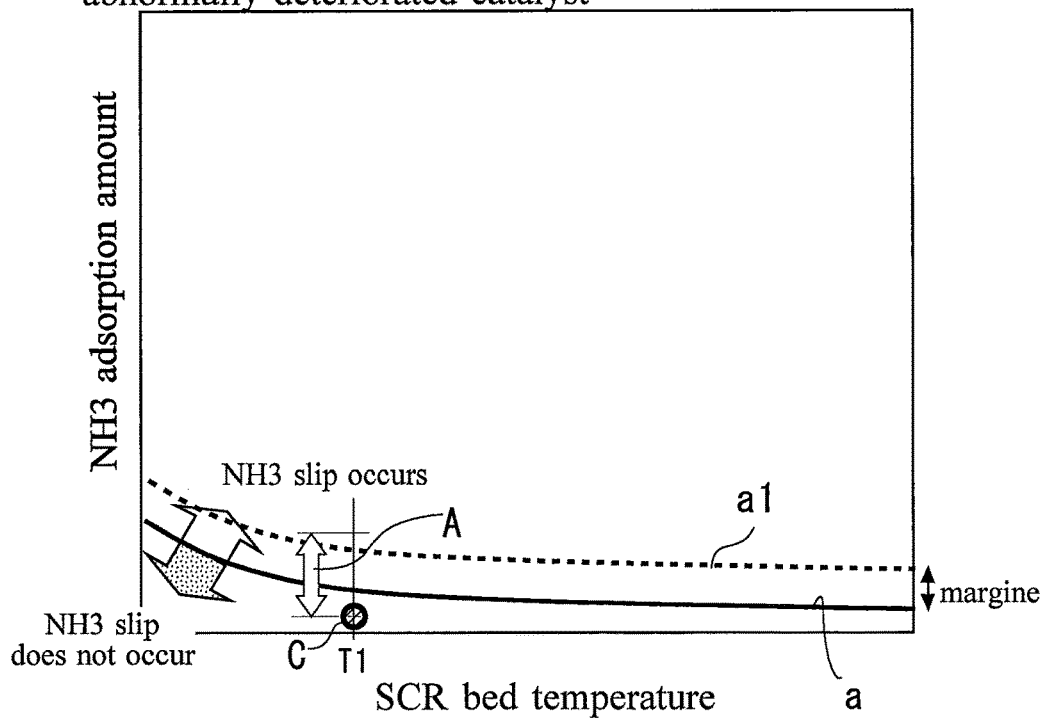
FIG. 2 is a diagram illustrating a relationship between bed temperature and an $NH_3$ adsorption amount of an abnormally deteriorated selective reduction catalyst.
Figure 3:
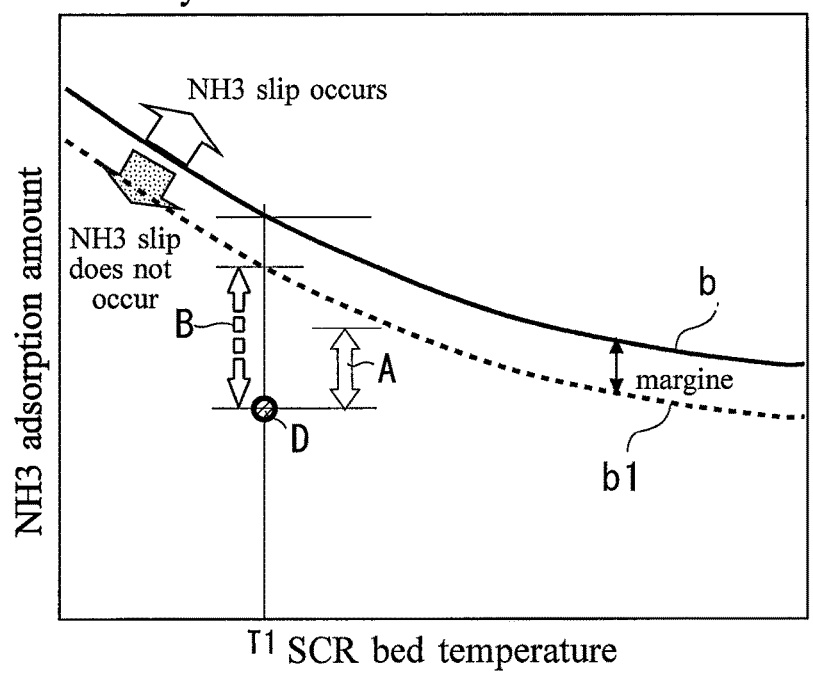
FIG. 3 is a diagram illustrating a relationship between a selective reduction catalyst bed temperature and an $NH_3$ adsorption amount of a normal selective reduction catalyst.

2. Abnormality Diagnosis of SCR Catalyst (1) Concept of Abnormality Diagnosis of SCR Catalyst One of the functions of the control device 30 is an OBD (On-board diagnostics) function of performing self-diagnosis of presence or absence of abnormality of the SCR catalyst 20. Hereinafter, control of abnormality diagnosis of the SCR catalyst 20 by the control device 30 will be described. FIG. 2 is a diagram illustrating a relationship between an SCR bed temperature and an $NH_3$ adsorption amount of an abnormally deteriorated catalyst, and FIG. 3 is a diagram illustrating a relationship between an SCR bed temperature and an $NH_3$ adsorption amount of a normal catalyst. The "abnormally deteriorated catalyst" means an SCR catalyst that is so deteriorated as to be diagnosed as having abnormality in reduction performance, and the "normal catalyst" means an SCR catalyst having normal reduction performance. Further, the "SCR bed temperature" means a bed temperature of the SCR catalyst 20.

In FIG. 2, a curve "a" represents a maximum adsorption amount that is an upper limit value of an $NH_3$ adsorption amount capable of being adsorbed by the abnormally deteriorated catalyst, and in FIG. 3, a curve "b" represents a maximum adsorption amount that is an upper limit value of $NH_3$ capable of being adsorbed by the normal catalyst. That is, it is conceivable that $NH_3$ slip in which $NH_3$ desorbs from the SCR catalyst 20 occurs, when the $NH_3$ adsorption amount exceeds the curve "a" in the abnormally deteriorated catalyst, or when the $NH_3$ adsorption amount exceeds the curve "b" in the normal catalyst.

The control device 30 executes "active addition" that supplies a large amount of $NH_3$ at the time of abnormality diagnosis of the SCR catalyst 20. The control device 30 diagnoses presence or absence of abnormality of the SCR catalyst 20 based on whether or not the $NH_3$ slip occurs by active addition of a urea solution. Here, a supply amount of $NH_3$ in active addition is set as a supply amount A.

When the SCR catalyst 20 is a normal catalyst, the maximum adsorption amount (refer to the curve "b") is large as illustrated in FIG. 3, so that a difference between a present $NH_3$ adsorption amount D and the maximum adsorption amount is also large. Accordingly, even when $NH_3$ in the supply amount A is supplied, the $NH_3$ adsorption amount does not exceed the maximum adsorption amount, and $NH_3$ slip does not occur.

On the other hand, when the SCR catalyst 20 is the abnormally deteriorated catalyst, the maximum adsorption amount (refer to the curve "a") is small as illustrated in FIG. 2, so that a difference between a present $NH_3$ adsorption amount C and the maximum adsorption amount is also small. Accordingly, even when only a small amount of $NH_3$ is supplied, $NH_3$ slip may occur. When $NH_3$ in the supply amount A is supplied by active addition, the $NH_3$ adsorption amount of the abnormally deteriorated catalyst immediately reaches the maximum adsorption amount, and the $NH_3$ slip occurs. In this way, presence or absence of abnormality of the SCR catalyst 20 is diagnosed based on whether or not the $NH_3$ slip occurs as a result of active addition.

Note that when the $NH_3$ slip occurs, $NH_3$ flows out to a downstream side of the SCR catalyst 20. Accordingly, presence or absence of occurrence of the $NH_3$ slip can be determined based on whether or not an $NH_3$ concentration of exhaust gas which is discharged to the downstream side of the SCR catalyst 20 is higher than the threshold value. The $NH_3$ concentration at the downstream side of the SCR catalyst 20 is detected based on an output of the $NH_3$ sensor 36.

(2) Execution Condition of Active Addition

In FIG. 2, an adsorption upper limit of $NH_3$ at which the $NH_3$ slip reliably occurs is shown by a broken line a1 when the SCR catalyst 20 is an abnormally deteriorated catalyst. The adsorption upper limit shown by the broken line a1 is a value obtained by adding a margin with a variation or the like taken into consideration to the maximum adsorption amount (curve "a") in the abnormally deteriorated catalyst. The supply amount A at the abnormality diagnosis time which is the supply amount in active addition is set at a value that is reliably larger than a difference between the present $NH_3$ adsorption amount C and the adsorption upper limit (broken line a1). Thereby, when the SCR catalyst 20 is the abnormally deteriorated catalyst, the $NH_3$ slip is reliably caused by active addition, and determination that a catalyst abnormality is present is made.

In FIG. 3, an adsorption lower limit of $NH_3$ at which the $NH_3$ slip can occur even when the SCR catalyst 20 is a normal catalyst is shown by a broken line b1. The adsorption lower limit shown by the broken line b1 is a value obtained by subtracting a margin with a variation taken into consideration from the maximum adsorption amount (curve "b") in the normal catalyst. The adsorption lower limit illustrated in FIG. 3 is a lower limit value at which the $NH_3$ slip can occur in the normal catalyst, and conversely, it can be said that the $NH_3$ slip does not occur unless this adsorption lower limit is exceeded when the catalyst is a normal catalyst.

Here, a limit supply amount B that is a difference between an $NH_3$ adsorption amount in a present SCR bed temperature T1 and the adsorption lower limit (broken line b1) means an upper limit value of an amount at which the $NH_3$ slip does not occur even by active addition, and determination of "normal catalyst" is obtained when the SCR catalyst 20 is a normal catalyst. Accordingly, in the control of the abnormality diagnosis of the present embodiment, the supply amount A at the abnormality diagnosis time<the limit supply amount B is an active addition condition. Thereby, erroneous determination in which the SCR catalyst 20 is determined as "abnormal" when the SCR catalyst 20 is normal can be avoided.

(3) Estimation of $NH_3$ Adsorption Amount of SCR Catalyst 20

Incidentally, for determination of establishment of the condition of active addition described above or the like, it is necessary to grasp the $NH_3$ adsorption amount of the SCR catalyst 20. In the present embodiment, the control device 30 has a function for calculating the $NH_3$ adsorption amount of the SCR catalyst 20.

Figure 4:
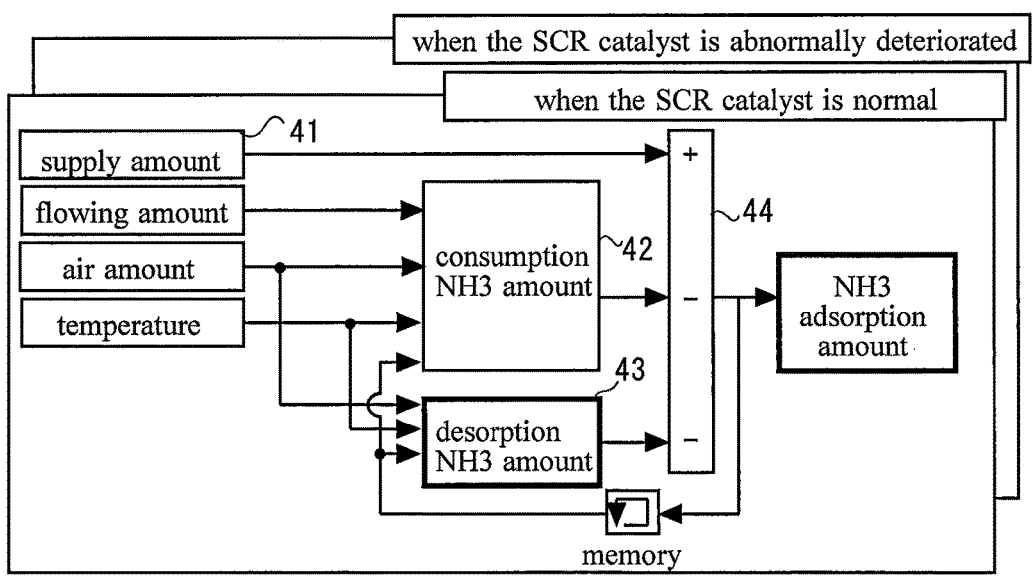
FIG. 4 is a block diagram illustrating a function of calculating the $NH_3$ adsorption amount, which the control device of the embodiment has.

FIG. 4 is a block diagram illustrating a function of calculating the $NH_3$ adsorption amount, which the control device 30 has. In FIG. 4, out of the functions of the control device 30, the function relating to calculation of the $NH_3$ adsorption amount is extracted and expressed in blocks. In FIG. 4, arithmetic operation units 41, 42, 43 and 44 are assigned to the respective functions. However, the arithmetic operation units 41 to 44 do not exist as hardware, but are virtually realized when a program stored in the memory is executed.

In the arithmetic operation unit 41, a supply $NH_3$ amount is calculated. The supply $NH_3$ amount is calculated based on a supply amount of the urea solution from the urea addition valve 22.

In the arithmetic operation unit 42, a consumption $NH_3$ amount is calculated. An $NH_3$ consumption amount is calculated from a NOx reduction efficiency of the SCR catalyst 20 and a NOx amount which flows in. Here, the NOx reduction efficiency has a correlation with an air amount (that is, a flow rate of exhaust gas flowing into the SCR catalyst 20), the SCR bed temperature and the $NH_3$ adsorption amount in the SCR catalyst 20. A specific correlation can be obtained in advance by an experiment or the like. In the present embodiment, a map in which the air amount, the SCR bed temperature and the $NH_3$ adsorption amount are arguments is created based on the correlation, and is stored in the control device 30 in advance. The $NH_3$ adsorption amount of the SCR catalyst 20 described later, a NOx concentration at an inlet of the SCR catalyst 20, an amount of air flowing into the SCR catalyst 20, and the SCR bed temperature are input to the arithmetic operation unit 42. The arithmetic operation unit 42 calculates the NOx reduction efficiency in accordance with the map of the NOx reduction efficiency in accordance with the air amount, the SCR bed temperature and the $NH_3$ adsorption amount which are inputted. Further, the consumption $NH_3$ amount is calculated in accordance with the calculated NOx reduction efficiency, and the amount of NOx flowing into the SCR catalyst 20.

The NOx reduction efficiency differs significantly depending on whether the SCR catalyst 20 is normal or abnormally deteriorated. Accordingly, both of the case in which the SCR catalyst 20 is a normal catalyst and the case in which the SCR catalyst 20 is abnormally deteriorated catalyst are assumed, and maps of the NOx reduction efficiencies are individually prepared in accordance with respective characteristics of the normal catalyst and the abnormally deteriorated catalyst. The arithmetic operation unit 42 calculates a consumption $NH_3$ amount in the case of the SCR catalyst 20 being assumed as normal, and a consumption $NH_3$ amount in the case of the SCR catalyst 20 being assumed as abnormally deteriorated, respectively.

In the arithmetic operation unit 43, a desorption $NH_3$ amount is calculated. The desorption $NH_3$ amount is calculated from the air amount and a desorption $NH_3$ concentration. Here, the desorption $NH_3$ concentration, the SCR bed temperature and the $NH_3$ adsorption amount have a correlation. When the $NH_3$ adsorption amount is the same, as the SCR bed temperature is higher, the desorption $NH_3$ amount is also larger. When the SCR bed temperature is the same, as the $NH_3$ adsorption amount is larger, the desorption $NH_3$ amount is also larger. The specific correlation can be obtained in advance by an experiment or the like. In the present embodiment, based on the correlation, a map of the desorption $NH_3$ concentration with the SCR bed temperature and the $NH_3$ adsorption amount as the arguments is created, and is stored in the control device 30 in advance. The air amount, the SCR bed temperature and the $NH_3$ adsorption amount of the SCR catalyst described later are inputted to the arithmetic operation unit 43. The arithmetic operation unit 43 calculates the desorption $NH_3$ concentration in accordance with the map of the desorption $NH_3$ concentration, in response to the SCR bed temperature and the $NH_3$ adsorption amount. Further, the arithmetic operation unit 43 calculates the desorption $NH_3$ amount by multiplying the calculated desorption $NH_3$ concentration by an air amount.

Incidentally, the desorption $NH_3$ concentration differs significantly depending on whether the SCR catalyst 20 is normal, or abnormally deteriorated. Accordingly, both of the case in which the SCR catalyst 20 is a normal catalyst and the case in which the SCR catalyst 20 is an abnormally deteriorated catalyst are assumed, and maps of the desorption $NH_3$ concentrations are individually prepared in accordance with the respective characteristics of the normal catalyst and the abnormally deteriorated catalyst. The arithmetic operation unit 43 calculates the desorption $NH_3$ concentration in the case of the SCR catalyst 20 being assumed as normal and the desorption $NH_3$ concentration in the case of the SCR catalyst 20 being assumed as abnormally deteriorated respectively by using the respective maps.

In the arithmetic operation unit 44, the $NH_3$ adsorption amount is calculated. Specifically, to the arithmetic operation unit 44, the supply $NH_3$ amount, the consumption $NH_3$ amount calculated by the arithmetic operation unit 42, and the desorption $NH_3$ amount calculated by the arithmetic operation unit 43 are inputted. The arithmetic operation unit 44 calculates the NH adsorption amount in accordance with mathematical expression 1, in response to the supply $NH_3$ amount, the consumption $NH_3$ amount and the desorption $NH_3$ amount which are inputted.

$NH_3$ adsorption amount=supply $NH_3$ amount−consumption $NH_3$ amount− desorption $NH_3$ amount [Mathematical expression 1]

The $NH_3$ adsorption amount calculated by the arithmetic operation unit 44 is outputted as the estimation value of the $NH_3$ adsorption amount and is stored in the memory, further inputted respectively to the arithmetic operation units 42 and 43, and is used in arithmetic operations in the arithmetic operation units 42 and 43.

(4) Control of Abnormality Diagnosis

Figure 5:
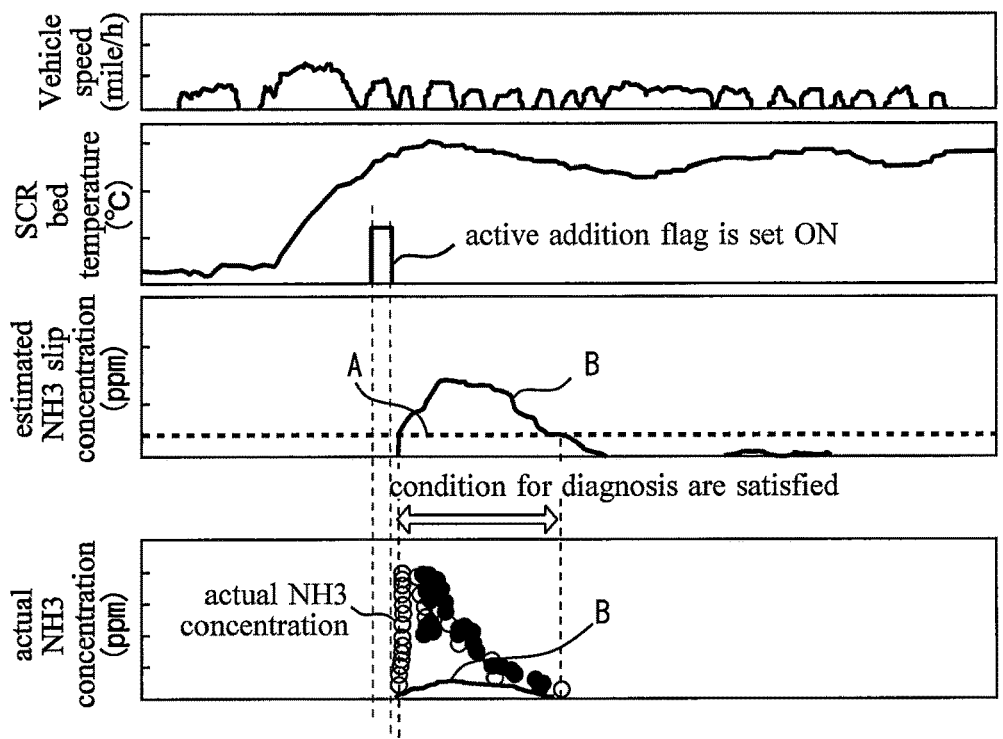
FIG. 5 is a timing chart of control of abnormality diagnosis by the control device of the embodiment.

FIG. 5 is a timing chart of control of abnormality diagnosis by the control device 30. In an example illustrated in FIG. 5, active addition is executed when the active addition condition is established, and an active addition flag is set ON.

An upper limit value of an $NH_3$ slip concentration estimated at a time of active addition when the SCR catalyst 20 is assumed as normal is shown by a broken line A in FIG. 5. The value is a value corresponding to a value obtained by subtracting an adsorption lower limit (broken line b1 in FIG. 3) at a normal time from the estimated value of the $NH_3$ adsorption amount in the case of a normal catalyst and the supply amount A at the abnormality diagnosis time of $NH_3$ at the time of active addition. A lower limit value of the $NH_3$ slip concentration assumed at the time of active addition when the SCR catalyst 20 is assumed as abnormally deteriorated is shown by a solid line B. The value is a value corresponding to a value obtained by subtracting the adsorption upper limit (broken line a1 in FIG. 2) at the time of abnormally deteriorated from the estimated value of the $NH_3$ adsorption amount in the case of an abnormally deteriorated catalyst and the supply amount A at the abnormality diagnosis time.

As described, the condition of the active addition is that the supply amount A at the abnormality diagnosis time<the limit supply amount B, so that the upper limit value of the estimated $NH_3$ slip concentration (the broken line A) in the case of the SCR catalyst 20 being normal is a value stable in a vicinity of zero. The lower limit value (the solid line B) of the estimated $NH_3$ slip concentration in the case of the SCR catalyst 20 being assumed as abnormally deteriorated significantly increases by the active addition. In the present embodiment, the SCR catalyst 20 is diagnosed as having abnormality when the concentration of $NH_3$ actually discharged to a downstream side of the SCR catalyst 20 exceeds the lower limit value with the lower limit value (solid line B) of the estimated $NH_3$ slip concentration as a threshold value.

FIG. 5 illustrates an example of a case in which the SCR catalyst 20 is abnormally deteriorated. Accordingly, an actual $NH_3$ concentration that is an actual measured value of the actual $NH_3$ concentration at the downstream side of the SCR catalyst 20 also significantly increases with active addition. The value greatly exceeds the threshold value which is the lower limit value (the solid line B) of the aforementioned estimated $NH_3$ slip concentration, and in the example of FIG. 5, the SCR catalyst 20 is diagnosed as having abnormality.

Figure 6:
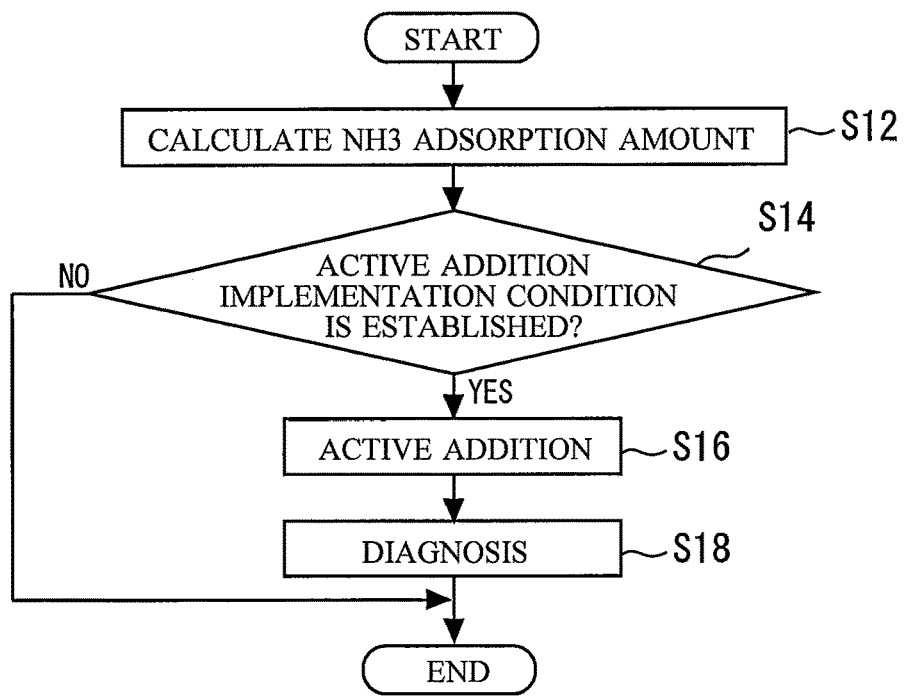
FIG. 6 is a flowchart illustrating a routine of specific control executed by the control device of the embodiment.

FIG. 6 is a flowchart illustrating a routine of specific control executed by the control device 30. In the routine in FIG. 6, first of all, in step S12, the present $NH_3$ adsorption amount of the SCR catalyst 20 is calculated. Here, $NH_3$ adsorption amounts are calculated, which are in the respective cases of the case in which the SCR catalyst 20 is assumed as normal and the case in which the SCR catalyst 20 is abnormally deteriorated as described above.

Next, in step S14, it is determined whether or not the implementation condition of the active addition is established. As described above, the implementation condition of the active addition is that the limit supply amount B is larger than the supply amount A at the abnormality diagnosis time which is the supply amount at the time of active addition.

When it is determined that the implementation condition of the active addition is not established in step S14, a process of this time is directly ended.

When it is determined that the implementation condition of the active addition is established in step S14, active addition is executed in step S16 next. That is, a urea solution in an amount corresponding to the supply amount A at the abnormality diagnosis time is supplied from the urea addition valve 22 so that $NH_3$ in the supply amount A at the abnormality diagnosis time is supplied to the SCR catalyst 20.

Next, the process advances to step S18, and presence or absence of abnormality of the SCR catalyst 20 is diagnosed. That is, after execution of the active addition, the $NH_3$ concentration at the downstream side of the SCR catalyst 20 is acquired, and based on whether or not the acquired $NH_3$ concentration is larger than the threshold value, determination of presence or absence of abnormal deterioration is performed. Thereafter, the process at this time is ended for a time.

3. Decrease Control of Urea Solution Supply Amount (1) Outline of Decrease Control of Urea Solution Supply Amount One of the functions of the control device 30 is a function of decreasing the amount of $NH_3$ after diagnosis of presence or absence of abnormality of the SCR catalyst 20. Hereinafter, decrease control of the urea solution supply amount by the function of the control device 30 will be described.

In the diagnosis control of abnormal deterioration of the catalyst described above, active addition is executed, so that the amount of $NH_3$ adsorbing to the SCR catalyst 20 temporarily increases. As described above, in order to execute control of abnormality diagnosis, it is necessary that the supply amount A at the abnormality diagnosis time<the limit supply amount B is established. Here, the limit supply amount B is a value obtained by subtracting the estimated value of the $NH_3$ adsorption amount in the case of the SCR catalyst 20 being assumed as normal, from the adsorption lower limit (broken line a1) of $NH_3$ at which $NH_3$ slip occurs. Accordingly, in order to establish the execution condition of active addition early, it is necessary to decrease the amount of $NH_3$ that adsorbs to the SCR catalyst 20 early.

Therefore, in the present embodiment, the control device 30 temporarily decreases an addition amount of the urea solution after execution of the active addition. However, when the $NH_3$ adsorption amount is small even after execution of the active addition, decrease of the amount is not performed. Further, an instantaneous supply $NH_3$ amount also affects removal of NOx in addition to the $NH_3$ adsorption amount. Accordingly, when a required equivalent ratio is high, decrease of the supply amount of urea solution is not executed. Thereby, deterioration in NOx reduction efficiency can be avoided. Further, as the required equivalent ratio is high, the $NH_3$ consumption amount also becomes high, so that it is assumed that the $NH_3$ adsorption amount can be decreased to an ordinary adsorption amount early without executing decrease of addition of a urea solution.

(2) Required Equivalent Ratio

Figure 7:
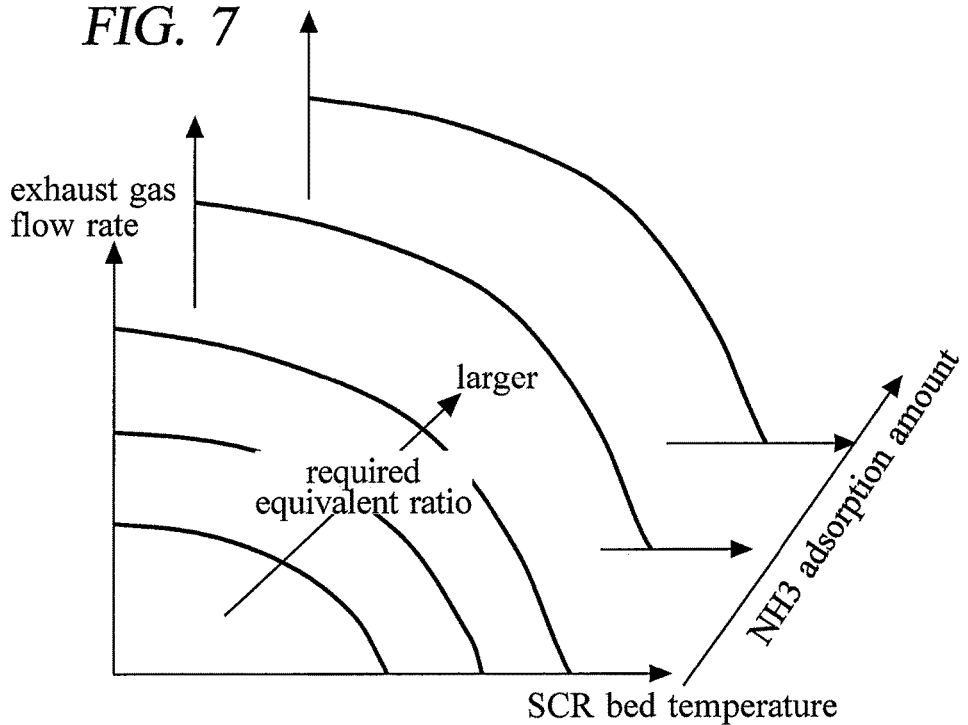
FIG. 7 is a diagram for explaining a relationship among the SCR bed temperature, an exhaust gas flow rate, the $NH_3$ adsorption amount and an equivalent ratio in the embodiment.

FIG. 7 is a diagram for explaining a relationship among the SCR bed temperature, an exhaust gas flow rate, the $NH_3$ adsorption amount and an equivalent ratio. By using FIG. 7, a calculation method of the required equivalent ratio will be described. Here, the required equivalent ratio is an addition amount of urea solution just enough that is required to perform reduction treatment of NOx, and indicates an addition amount necessary per unit concentration. The required equivalent ratio is multiplied by the NOx concentration, and thereby a urea solution supply amount is calculated.

As illustrated in FIG. 7, the required equivalent ratio has a correlation with the exhaust gas flow rate, the SCR bed temperature and the $NH_3$ adsorption amount. When the SCR bed temperature and the $NH_3$ adsorption amount are fixed, for example, the required equivalent ratio is larger as the exhaust gas flow rate is larger, and when the exhaust gas flow rate and the $NH_3$ adsorption amount are fixed, the required equivalent ratio is larger as the SCR bed temperature is higher. Further, when the SCR bed temperature and the exhaust gas flow rate are fixed, the required equivalent ratio becomes smaller as the $NH_3$ adsorption amount is larger. The specific relationship among the exhaust gas flow rate, the SCR bed temperature, the $NH_3$ adsorption amount and the required equivalent ratio as illustrated in FIG. 7 is obtained in advance by an experiment and the like. This is set as a map and is stored in the control device 30. The required equivalent ratio is calculated in accordance with the map, with the exhaust gas flow rate, the SCR bed temperature and the $NH_3$ adsorption amount as arguments.

(3) Example of Decrease Control of Urea Solution Supply Amount

Figure 8:
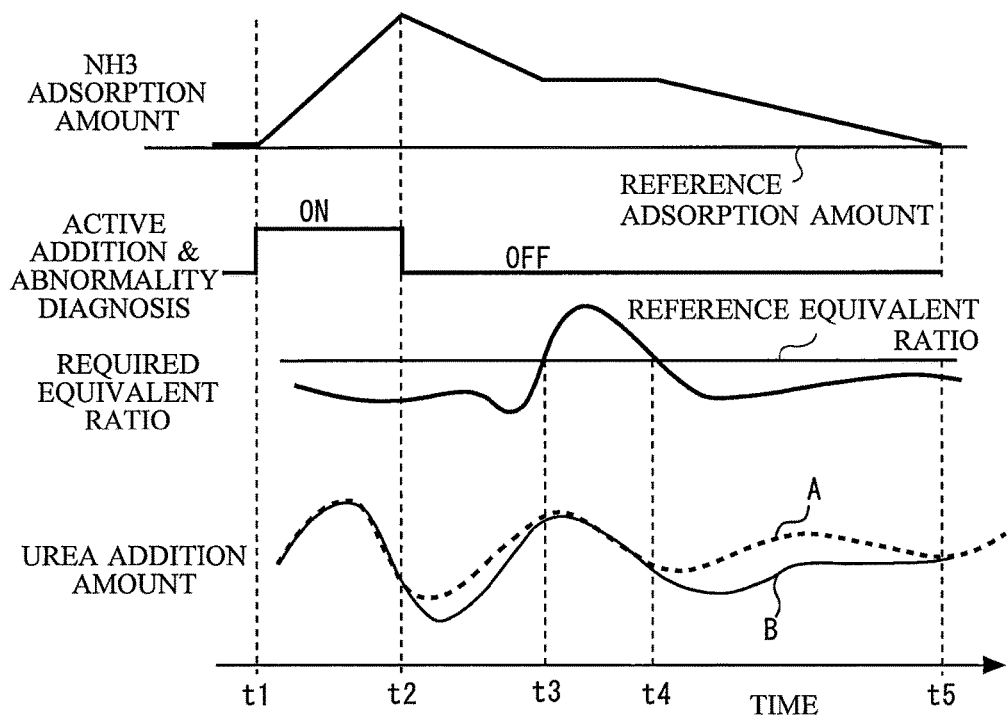
FIG. 8 is a timing chart for explaining the decrease control of the urea solution supply amount of the embodiment.

FIG. 8 is a timing chart for explaining the decrease control of the urea solution supply amount of the present embodiment. As illustrated in FIG. 8, the $NH_3$ adsorption amount of the SCR catalyst 20 abruptly increases from an adsorption amount at a normal time in a time period from t1 to t2 during execution of active addition and abnormality diagnosis of the SCR catalyst. Note that in an example in FIG. 8, the SCR catalyst 20 is a normal catalyst.

In a time point t2 when control of abnormality diagnosis of the SCR catalyst 20 is ended, decrease correction that decreases a urea solution supply amount from the urea solution supply amount at a normal time is performed under conditions that the required equivalent ratio is smaller than a reference equivalent ratio, and the $NH_3$ adsorption amount is larger than a reference adsorption amount. The reference equivalent ratio is a value determined by adaptation based on such an equivalent ratio that a required instantaneous $NH_3$ supply amount is small, and the NOx reduction efficiency is not reduced even when the supply amount of a urea solution is decreased. Further, the reference adsorption amount is a value determined by adaptation based on an adsorption amount such that $NH_3$ slip is not generated when the catalyst is a normal catalyst even when active addition is executed.

The decrease correction of the urea solution supply amount is correction that multiples a correction coefficient that is determined in accordance with the $NH_3$ adsorption amount and the required equivalent ratio. The correction coefficient is a value smaller than one, and is set at a smaller value as the $NH_3$ adsorption amount is larger when compared under the condition that the required equivalent ratio is fixed. That is, as the $NH_3$ adsorption amount is larger, the decrease amount becomes larger. Further, the correction coefficient is set at a larger value as the required equivalent ratio is larger, as compared under the condition that the $NH_3$ adsorption amount is fixed. That is, as the required equivalent ratio is larger, the decrease amount is smaller. The relationship among the $NH_3$ adsorption amount, the required equivalent ratio and the correction coefficient is determined by adaptation.

In FIG. 8, a urea solution supply amount in the case where decrease correction is not performed is shown by a broken line A, and a urea solution supply amount after decrease correction is shown by a solid line B. In the example in FIG. 8, the required equivalent ratio exceeds the reference equivalent ratio in a time point t3, so that in the time point t3, decrease correction of the urea solution supply amount is temporarily stopped. When the required equivalent ratio becomes smaller than the reference equivalent ratio in a time point t4 again, decrease correction of the urea solution supply amount is restarted. In the example in FIG. 8, decrease correction of the urea solution supply amount is continued until a time point t5 when the $NH_3$ adsorption amount becomes the reference adsorption amount or less, and thereafter the decrease correction is ended.

(4) Control Routine of Decrease Control of Urea Solution Supply Amount

Figure 9:
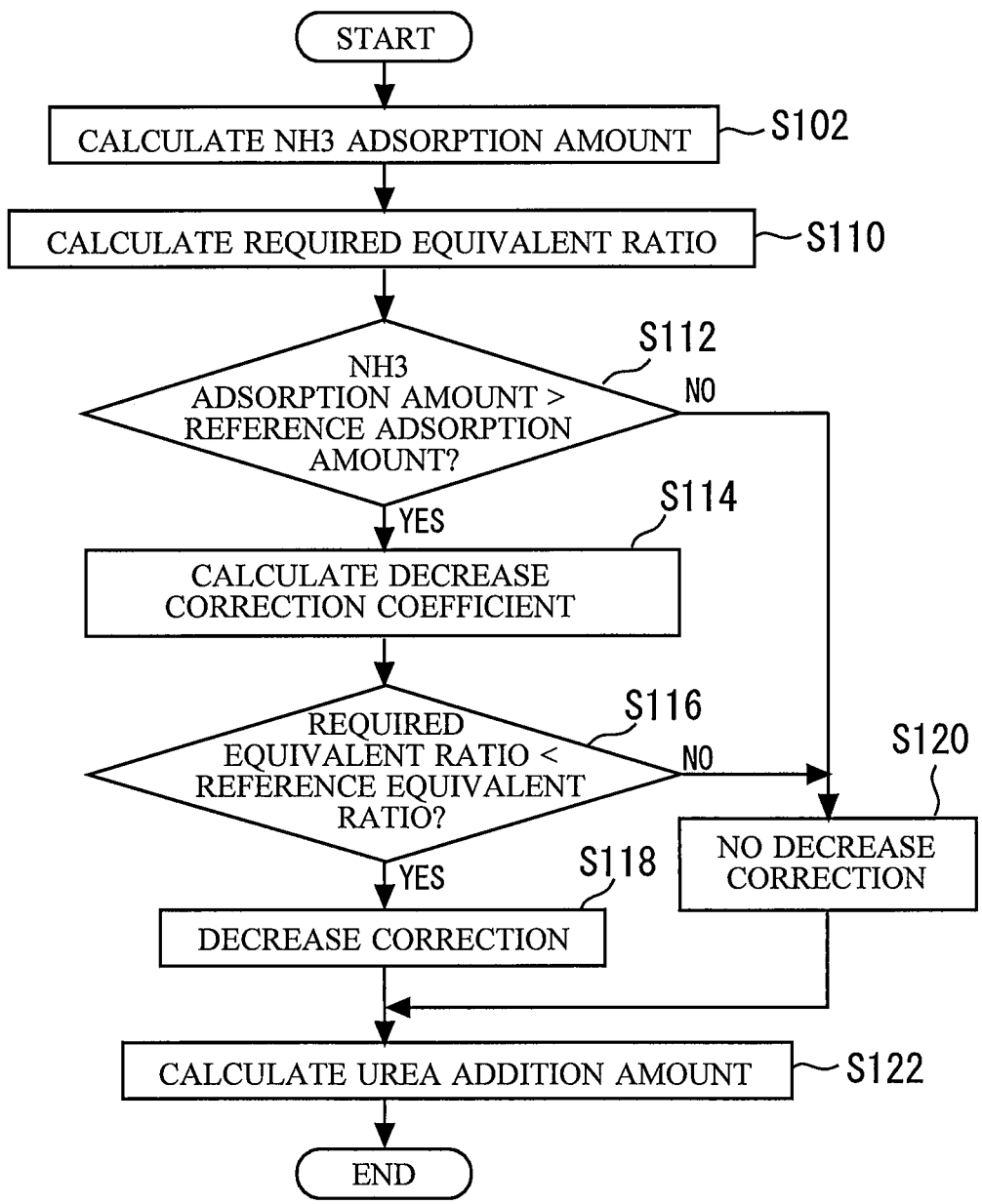
FIG. 9 is a flowchart for explaining a specific control routine executed by the control device of the embodiment.

FIG. 9 is a flowchart for explaining a specific control routine executed by the control device 30. As illustrated in FIG. 9, the $NH_3$ adsorption amount is calculated first in step S102. Here, when the SCR catalyst 20 is normal, for example, based on the diagnosis result of the SCR catalyst 20, only the $NH_3$ adsorption amount in the case of a normal catalyst is calculated. A method for calculation is as described above.

Next, the flow advances to step S110, and the required equivalent ratio is calculated. The required equivalent ratio is calculated in accordance with the map in response to the SCR bed temperature, the exhaust gas flow rate and the $NH_3$ adsorption amount as described above.

Next, the flow advances to step S112, and it is determined whether or not the $NH_3$ adsorption amount calculated in step S110 is larger than the reference adsorption amount.

When it is determined that the $NH_3$ adsorption amount is larger than the reference adsorption amount in step S112, the flow advances to step S114 next, and the decrease correction coefficient is calculated. The decrease correction coefficient is a value calculated in response to the $NH_3$ adsorption amount and the required equivalent ratio.

Next, the flow advances to step S116, and it is determined whether or not the required equivalent ratio is smaller than the reference equivalent ratio. When it is determined that the required equivalent ratio is smaller than the reference equivalent ratio in step S116, the flow advances to step S118 next, and decrease correction is set as present.

When it is determined as "NO" in step S112, that is, it is determined that the $NH_3$ adsorption amount is the reference adsorption amount or less, or when it is determined as "NO" in step S116, that is, when it is determined that the required equivalent ratio is the reference equivalent ratio or more, the flow advances to step S120, and the decrease correction is determined as absent.

After step S118 or step S120, the flow advances to step S122 next, and the urea solution supply amount is calculated. That is, when the decrease correction is determined as absent, the urea solution supply amount is calculated by multiplying the required equivalent ratio by the NOx concentration. The urea solution supply amount which is calculated at this time is a target supply amount required during normal NOx reduction, which is set in response to the concentration of Nox which flows into the SCR catalyst 20.

When the decrease correction is determined as present and the correction coefficient is set, the required equivalent ratio, the NOx concentration and the correction coefficient are multiplied, and the urea solution supply amount is calculated. The supply amount of the urea solution which is calculated at this time is a smaller amount as compared with the target supply amount which is required at the normal time to cleanse the exhaust gas of the NOx concentration. Thereafter, a process of this time is ended.

As described above, in the control of the present embodiment, the urea solution supply amount is subjected to decrease correction when the $NH_3$ adsorption amount is increased temporarily by active addition. Thereby, consumption of $NH_3$ adsorbing to the SCR catalyst 20 is promoted, and the $NH_3$ adsorption amount can be decreased early. Accordingly, the opportunity to diagnose abnormality of the SCR catalyst at the next time can be secured at an earlier stage as compared with the conventional apparatus. Further, the decrease of the urea solution supply amount in this case is executed under the conditions that the $NH_3$ adsorption amount is larger than the reference adsorption amount, and the required equivalent ratio is smaller than the reference equivalent ratio. Accordingly, reduction in NOx reduction efficiency by decrease of the urea solution supply amount can be avoided.

In the above embodiment, the case is described, in which the correction of decreasing the urea solution supply amount is executed by multiplying the correction coefficient which is set in accordance with the $NH_3$ adsorption amount and the required equivalent ratio when the required equivalent ratio is smaller than the reference equivalent ratio. However, the decrease control of the urea solution supply amount can be correction that decreases the urea solution supply amount within a range in which the necessary instantaneous supply $NH_3$ amount is secured after execution of active addition.

Accordingly, instead of the required equivalent ratio, another parameter correlated with the amount of a urea solution which is required in NOx reduction per unit NOx concentration can be used. Further, the correction amount of decrease correction may be a fixed amount or an amount that is calculated by a fixed correction coefficient. Alternatively, the correction amount of the decrease correction may be an amount that changes in accordance with either one of the $NH_3$ adsorption amount and the required equivalent ratio (or another parameter used instead of the required equivalent ratio), or may be an amount calculated by the correction coefficient that changes in accordance with either one or more of the $NH_3$ adsorption amount and the required equivalent ratio (or another parameter that is used instead of the required equivalent ratio).

While the calculation method of each estimated value that is used in the abnormality diagnosis of the SCR catalyst 20 or the decrease control of the urea solution supply amount is specifically described, the estimation method and the like of the $NH_3$ adsorption amount and the like are variously known, for example, and therefore the $NH_3$ adsorption amount and the like may be calculated by other known estimation methods.

What is claimed is:

1. An exhaust gas control apparatus for an internal combustion engine comprising:

a selective reduction catalyst that is disposed in an exhaust passage of an internal combustion engine, and reduces a nitrogen oxide in exhaust gas with ammonia as a reducing agent;

a urea solution supply device that is installed at an upstream side of the selective reduction catalyst, and supplies a urea solution to the exhaust passage; and a control device configured to control the urea solution supply device so that a urea solution in a target supply amount corresponding to a concentration of a nitrogen oxide flowing into the selective reduction catalyst is supplied to the selective reduction catalyst, wherein the control device is further configured to control the urea solution supply device so that a urea solution in a supply amount at an abnormality diagnosis time that is a larger supply amount than the target supply amount is supplied to the selective reduction catalyst, diagnose presence or absence of abnormality of the selective reduction catalyst in accordance with an amount of ammonia that is discharged to a downstream side of the selective reduction catalyst, while the urea solution in the supply amount at the abnormality diagnosis time is supplied, and control the urea solution supply device so that a supply amount of the urea solution becomes smaller than the target supply amount when an estimated amount of ammonia adsorbed by the selective reduction catalyst is larger than a reference adsorption amount, and an amount of a urea solution that is required in removal of nitrogen oxide per unit is smaller than a reference urea solution amount, after diagnosis of presence or absence of abnormality of the selective reduction catalyst.

* * * * *